UNITED STATES PATENT OFFICE.

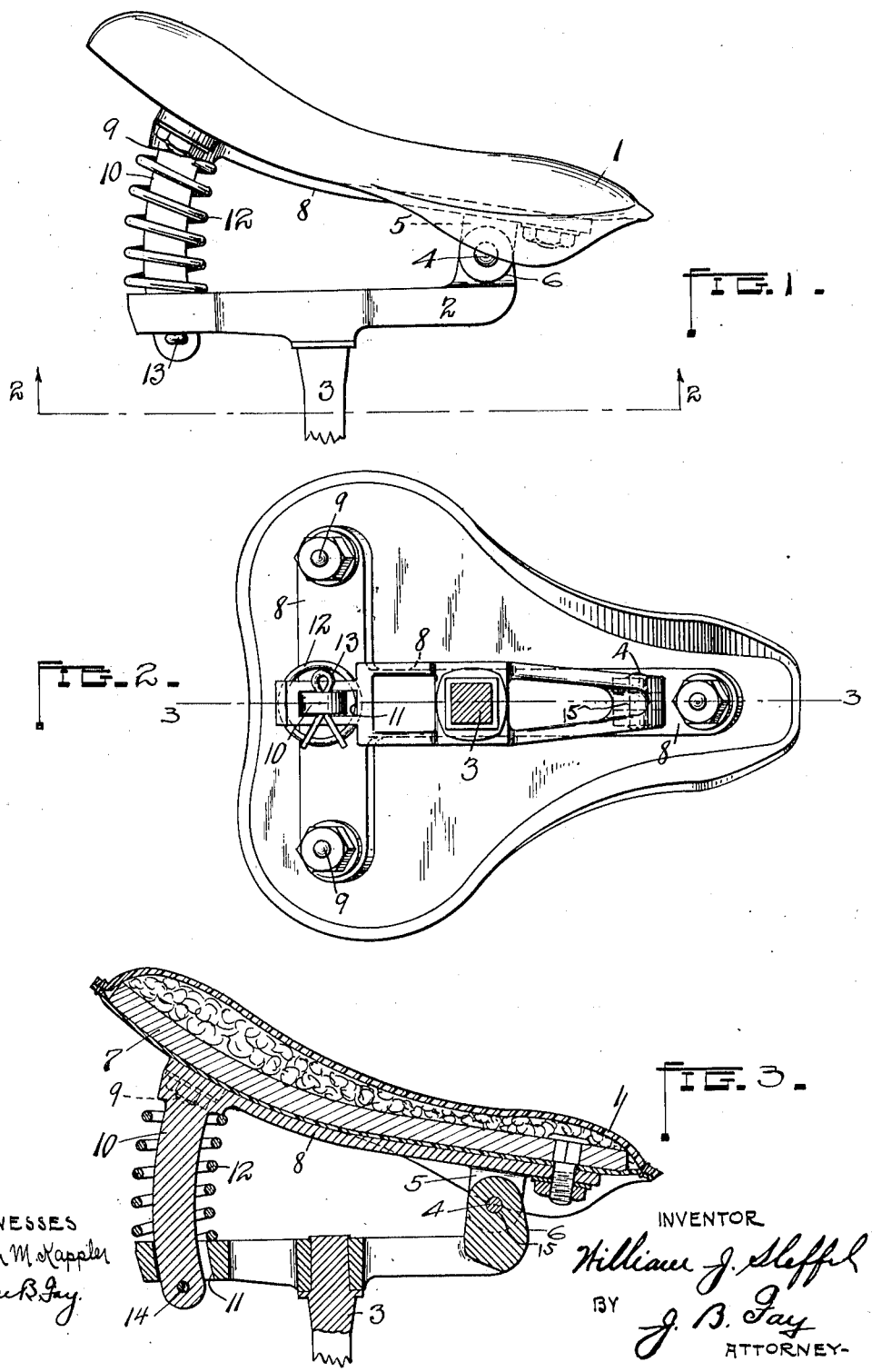

WILLIAM J. SLEFFEL, OF CLEVELAND, OHIO, ASSIGNOR TO THE KIRK-LATTY MANUFACTURING COMPANY, OF CLEVELAND, OHIO, A CORPORATION OF OHIO.

SPRING-SEAT FOR BICYCLES.

1,039,328.     Specification of Letters Patent.     Patented Sept. 24, 1912.

Application filed November 27, 1911. Serial No. 662,585.

*To all whom it may concern:*

Be it known that I, WILLIAM J. SLEFFEL, a citizen of the United States, and a resident of Cleveland, county of Cuyahoga, and State of Ohio, have invented a new and useful Improvement in Spring-Seats for Bicycles, of which the following is a specification, the principle of the invention being herein explained and the best mode in which I have contemplated applying that principle, so as to distinguish it from other inventions.

The present invention relates to a resiliently mounted seat adapted for use on bicycles and velocipedes of various descriptions.

The seat here illustrated will be used in particular upon small sized velocipedes and children's bicycles, in which the element of cost must be kept at the lowest possible figure. The present seat, by reason of its simplicity and low cost of manufacture, is especially adapted for the above mentioned use, although, of course, it may be applied with equally good results to the full sized bicycles and other vehicles of like description.

To the accomplishment of these and related ends, said invention, then, consists of the means hereinafter fully described and particularly pointed out in the claim.

The annexed drawing and the following description set forth in detail certain mechanism embodying the invention, such disclosed means constituting, however, but one of the various mechanical forms in which the principle of the invention may be used.

In said annexed drawing:—Figure 1 is a side elevation showing my improved seat; Fig. 2 is a sectional view on the line 2—2, Fig. 1, and Fig. 3 is a central longitudinal section on the line 3—3 in Fig. 2.

The seat proper 1 is mounted upon a supporting member 2. The latter has a downwardly projecting member 3 which is adapted to enter the frame of the bicycle and to be reciprocated therein, thus permitting adjustment of the seat at various heights. The seat is pivotally mounted at the forward end of the supporting member by means of a pin 4 which enters apertures 15 in a depending lug 5 on the external seat-frame 8 and an upwardly projecting lug 6 on the supporting member. The seat proper comprises an internal wooden frame 7, upon which there is curled hair or other padding, the whole being inclosed in leather, as is customary in bicycle seats. The external seat-frame 8 is attached to the seat proper by means of bolts 9 which enter the internal wooden frame and also the outer frame. A downwardly extending member 10 is attached to the external seat frame and slidably enters an aperture 11 in the supporting member. The member 10 is formed to correspond to a portion of the circumference of a circle described about the pin 4 at the front end of the seat as the center, and the aperture in the supporting member is formed to permit the reciprocation through the same of this downwardly depending member.

Resilient means, such as a coiled spring 12, are interposed between the frame of the seat and the supporting member. The spring here shown is coiled around the downwardly depending member 10. This spring is adapted to mitigate the severe shocks which would otherwise be transmitted directly from the frame of the vehicle to the seat proper. The latter, while shown in the several figures as being in an inclined position, will, when loaded, be substantially horizontal, thus placing the spring under a slight pressure and increasing the resilient qualities of the same and the easy riding qualities of the seat.

It will be seen that should the seat oscillate in a clockwise direction the member 10 would be in danger of coming out of the aperture 11. While this is not likely to occur, it is safeguarded against by the use of a cotter pin 13 which enters an aperture 14 in the lower end of the member 10. In this way the spring is securely locked between the supporting member and the external frame.

The several advantages of the present seat are its comfort, its simplicity and its low cost of manufacture. There are but few parts, and these can be easily made and assembled, whereas the majority of spring mounted seats which have been used on bicycles, have been extremely complicated and have comprised numerous parts, some of which are difficult to manufacture and required considerable labor to assemble. For these reasons the well known spring mounted bicycle seats have not been applied to velocipedes and children's bicycles, and it is to this latter purpose that the present seat is especially adapted, although the qualities which it possesses will obviously adapt it equally well to other uses.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a vehicle seat, the combination of a supporting member; a horizontally extending cross-piece; a second member pivotally attached at one end to the forward end of said cross-piece, such pivotal movement being in a vertical plane; a third member attached to said second member at right angles thereto; a seat mounted on said second and third members; a downwardly extending member attached at the point of intersection of said second and third members and curved to conform to the arc of a circle having as a center such point of pivotal attachment of said second member and said cross-piece, said curved member being slidably disposed in an aperture in the rear end of said cross-piece; and a coiled spring disposed around said curved member between said cross-piece and said third member.

Signed by me this 22nd day of November, 1911.

WILLIAM J. SLEFFEL.

Attested by—
F. H. McIsaac,
H. D. Reed.